United States Patent [19]
Iberg et al.

[11] 3,993,120
[45] Nov. 23, 1976

[54] SPACE THERMOSTAT

[75] Inventors: Willard J. Iberg, St. Louis County; Claude H. Keathley, Arnold, both of Mo.

[73] Assignee: Emerson Electric Co., St. Louis, Mo.

[22] Filed: Nov. 18, 1974

[21] Appl. No.: 525,000

[52] U.S. Cl. ................................ 165/26; 236/1 C; 236/1 E; 337/80; 337/331
[51] Int. Cl.² .................... F25B 29/00; G05D 23/00
[58] Field of Search .................. 236/1 C, 1 E, 91 D; 337/80, 331; 165/26

[56] References Cited
UNITED STATES PATENTS

| | | | |
|---|---|---|---|
| 2,171,099 | 8/1939 | Hartmann-Riis | 236/1 E |
| 2,978,228 | 4/1961 | Carlson | 236/1 E |
| 3,047,273 | 7/1962 | Scarr, Jr. | 165/26 |
| 3,193,198 | 7/1965 | Carlson | 236/1 C |
| 3,284,002 | 11/1966 | Edelman et al. | 236/1 C |

*Primary Examiner*—Albert W. Davis, Jr.
*Assistant Examiner*—Sheldon Richter
*Attorney, Agent, or Firm*—Paul A. Becker, Sr.

[57] ABSTRACT

A space thermostat for controlling the two-stage operation of both heating and cooling apparatus includes two single-pole, double-throw mercury type switches operatively connected to a single bimetallic coil. One switch energizes stage one of the heating apparatus when tilted in one direction and energizes stage two of the cooling apparatus when tilted in the other direction. The other switch energizes stage two of the heating apparatus when tilted more in the direction which effected the energizing of stage one of the heating apparatus and energizes stage one of the cooling apparatus when tilted less in the direction which effected the energizing of stage two of the cooling apparatus. The switches are adjustably mounted with respect to each other so that the differential between stages can be adjusted to be the same as the differential of each switch. With the differential between stages so adjusted, the energizing temperature of stage one of the heating apparatus and the energizing temperature of stage one of the cooling apparatus are automatically the same, a feature which simplifies the calibration of the thermostat. Printed circuit boards, attached to the switches, contain a portion of the internal wiring so as to reduce the amount of loose wiring.

11 Claims, 13 Drawing Figures

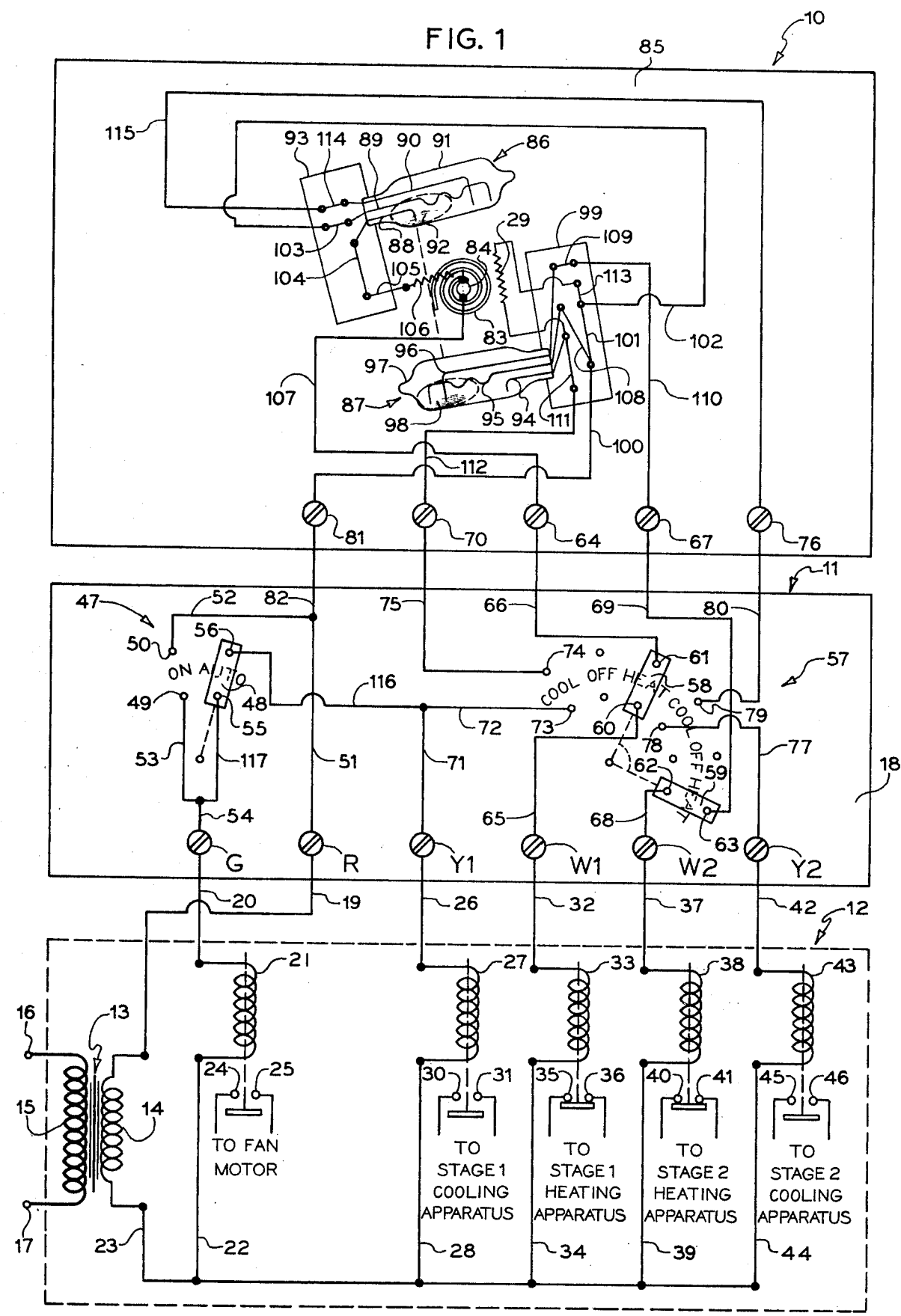

SPACE THERMOSTAT

This invention relates to space thermostats and particularly to space thermostats of the bimetallic coil type capable of controlling the two-stage operation of both heating and cooling apparatus.

BACKGROUND OF THE INVENTION

Heretofore, space thermostats capable of controlling the two-stage operating of both heating and cooling apparatus have employed two independently acting bimetallic coils, each coil having two single-pole, single-throw switches attached thereto. In this arrangement, one bimetallic coil and its attached switches control the two-stage operation of the heating apparatus and the other coil and its attached switches control the two-stage operation of the cooling apparatus.

SUMMARY OF THE INVENTION

An object of the present invention is to provide a generally new and improved space thermostat wherein a single bimetallic coil controls the two-stage operation of both heating and cooling apparatus.

A further object of this invention is to provide such a thermostat having two single-pole, double-throw switches operatively connected to a single bimetallic coil.

A further object of this invention is to provide such a thermostat including printed circuit boards for simplifying the internal wiring of the thermostat.

A further object is to provide a geneally new and improved space thermostat capable of controlling the two-stage operation of both heating and cooling apparatus, such thermostat being compact in construction and reltively inexpensive to calibrate.

In accordance with the present invention, a space thermostat comprises a single bimetallic coil with two single-pole, double-throw mercury type switches operatively connected thereto. When it includes sub-base having system selector means for heating and cooling, the thermostat is capable of controlling the two-stage operation of both heating and cooling apparatus. One mercury switch efffects the energizing of stage one of the heating apparatus when tilted in one direction, and effects the energizing of stage two of the cooling apparatus when tilted in the other direction. The other mercury switch effects the energizing of stage two of the heating apparatus when tilted further in the said one direction, and effects the energizing of stage one of the cooling apparatus when tilted a lesser amount in the said other direction. Adjustment means are provided between the switches to enable the temperature differential between the energizing of stage one of the heating apparatus and stage two of the heating apparatus to be adjusted to be the same as the differential of each mercury switch, so that after the thermostat has been calibrated for the temperature at which stage one of the heating apparatus is energized and after the temperature differential between stage one and stage two of the heating apparatus has been adjusted to be the same as the differential of each mercury switch, the temperatures at which stage one and stage two of the cooling apparatus are energized are automatically established, thereby negating any further calibrtion or adjustment.

Other objects and advantages of the present invention will become apparent from the following description when read in connection with the accompanying drawings.

BRIEF DESCRIPTION OF THE DRAWINGS

FIG. 1 is a diagrammatic illustration of a two-stage heating and cooling system including a space thermostat constructed in accordance with the present invention and showing the system in the heating mode with both stages of the heating apparatus energized;

DESCRIPTION OF THE PREFERRED EMBODIMENT

Figure 1A:
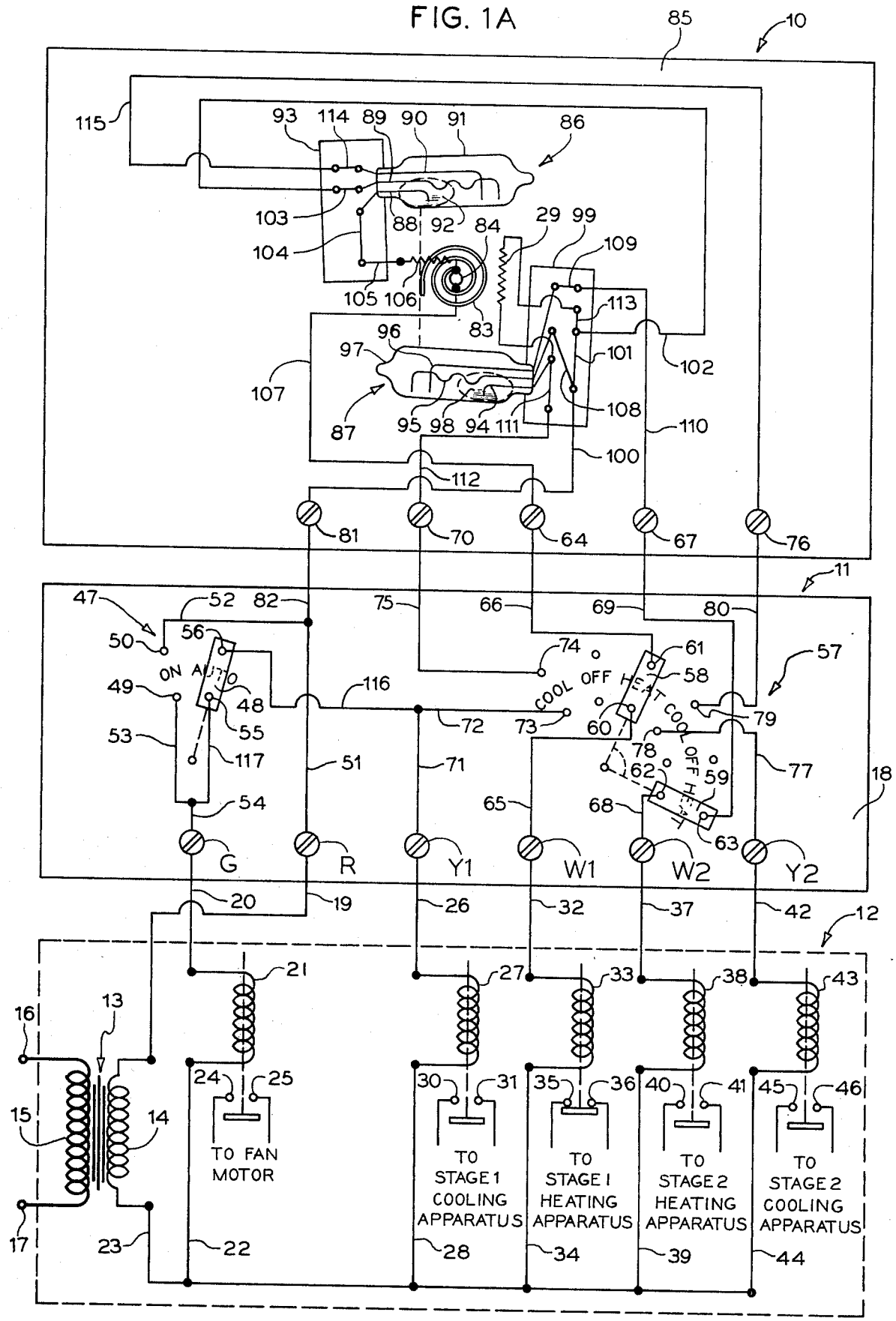
FIG. 1A is a diagrammatic illustration similar to FIG. 1, showing the system in the heating mode with only stage one of the heating apparatus energized.

Referring to FIGS. 1, 1A, 2 and 2A, a space thermostat to control the temperature in a conditioned space includes a thermostat switch assembly generally indicated at 10 and a sub-base generally indicated at 11. Connected to the sub-base 11 and controlled by sub-base 11 and the thermostat switch assembly 10 is a two-stage heating and cooling apparatus generally indicated at 12 and including therein a plurality of power relays, the low voltage coils of which are controlled by the thermostat switch assembly and sub-base 11. Electrical power to energize the operating coils is supplied by a voltage step-down transformer 13 having a secondary winding 14 and a primary winding 15, primary winding 15 being connected to terminals 16 and 17 of a conventional 120-volt alternating current power source.

The sub-base 11 is provided with a plurality of screw terminals G, R, Y1, W1, W2, and Y2 secured in an insulative mounting member 18. Terminal R is connected by a lead 19 to one side of the transformer secondary winding 14. Connected to terminal G by a lead 20 is one side of the operating coil 21 of a relay controlling the energizing of a fan motor (not shown). The other side of the coil 21 is connected by leads 22 and 23 to the other side of the transformer secondary winding 14. When the circuit between R and G is completed through the space thermostat, the coil 21 is energized, causing the fan motor to be energied through a set of relay contacts 24 and 25.

Connected to terminal Y1 by a lead 26 is one side of the operating coil 27 of a relay controlling the energizing of the stage one cooling apparatus. The other side of the coil 27 is connected by leads 28 and 23 to the other side of the transformer secondary winding 14. As will be described hereinafter, the coil 27 is energized only when an anticipating resistor 29 in the thermostat switch assembly 10 is effectively shunted. When resistor 29 is effectively shunted, the completed circuit between R and Y1 through the space thermostat enables the coil 27 to be energized which causes the stage one cooling apparatus to be energized through a set of relay contacts 30 and 31.

Connected to terminal W1 by a lead 32 is one side of the operating coil 33 of a relay controlling the energizing of the stage one heating apparatus. The other side of the coil 33 is connected by leads 34 and 23 to the other side of the transformer secondary winding 14. When the circuit between R and W1 is completed through the space thermostat, the coil 33 is energized, causing the stage one heating apparatus to be energized through a set of relay contacts 35 and 36.

A lead 37 connects one side of the operating coil 38 of a relay controlling the energizing of the stage two heating apparatus to terminal W2. The other side of the coil 38 is connected by leads 39 and 23 to the other side of the transformer secondary winding 14. When the circuit between R and W2 is completed through the space thermostat, the coil 38 is energized, causing the stage two heating apparatus to be energized through a set of relay contacts 40 and 41.

Similarly, connected to terminal Y2 by a lead 42 is one side of the operating coil 43 of a relay controlling the energizing of the stage two cooling apparatus. The other side of the coil 43 is connected by leads 44 and 23 to the other side of the transformer secondary winding 14. When the circuit between R and Y2 is completed through the space thermostat, the coil 43 is energized, causing the stage two cooling apparatus to be energized through a set of relay contacts 45 and 46.

Sub-base 11 contains a fan selector switch 47 which includes a shorting bar 48 movable to positions of "ON" or "AUTO." When in the ON position, shorting bar 48 connects terminals 49 and 50, thereby completing the circuit between sub-base terminals R and G through a lead 51, a lead 52, terminal 50, shorting bar 48, terminal 49, a lead 53, and a lead 54, enabling operating coil 21 of the fan motor relay to be energized and thus causing the fan motor to be energized through the relay contacts 24 and 25. Thus when the fan selector switch 47 is in the On position, the fan motor is continuously energized. When in the AUTO position, shorting bar 48 connects terminals 55 and 56 with an effect to be hereinafter described.

Sub-base 11 also contains a "COOL," "OFF," "HEAT" system selector switch 57 which includes a pair of shorting bars 58 and 59 which are mechanically linked together so that the bars 58 and 59 are movable together. When the selector switch 57 is in the HEAT position, shown in FIGS. 1 and 1A, shorting bar 58 connects terminals 60 and 61 while shorting bar 59 connects terminals 62 and 63. Shorting bar 58 connects terminal W1 to a terminal 64 in the thermostat switch assembly 10 through a lead 65, terminal 60, shorting bar 58, terminal 61, and a lead 66, while shorting bar 59 connects terminal W2 to a terminal 67 in thermostat switch assembly 10 through a lead 68, terminal 62, shorting bar 59, terminal 63, and a lead 69.

Figure 2:
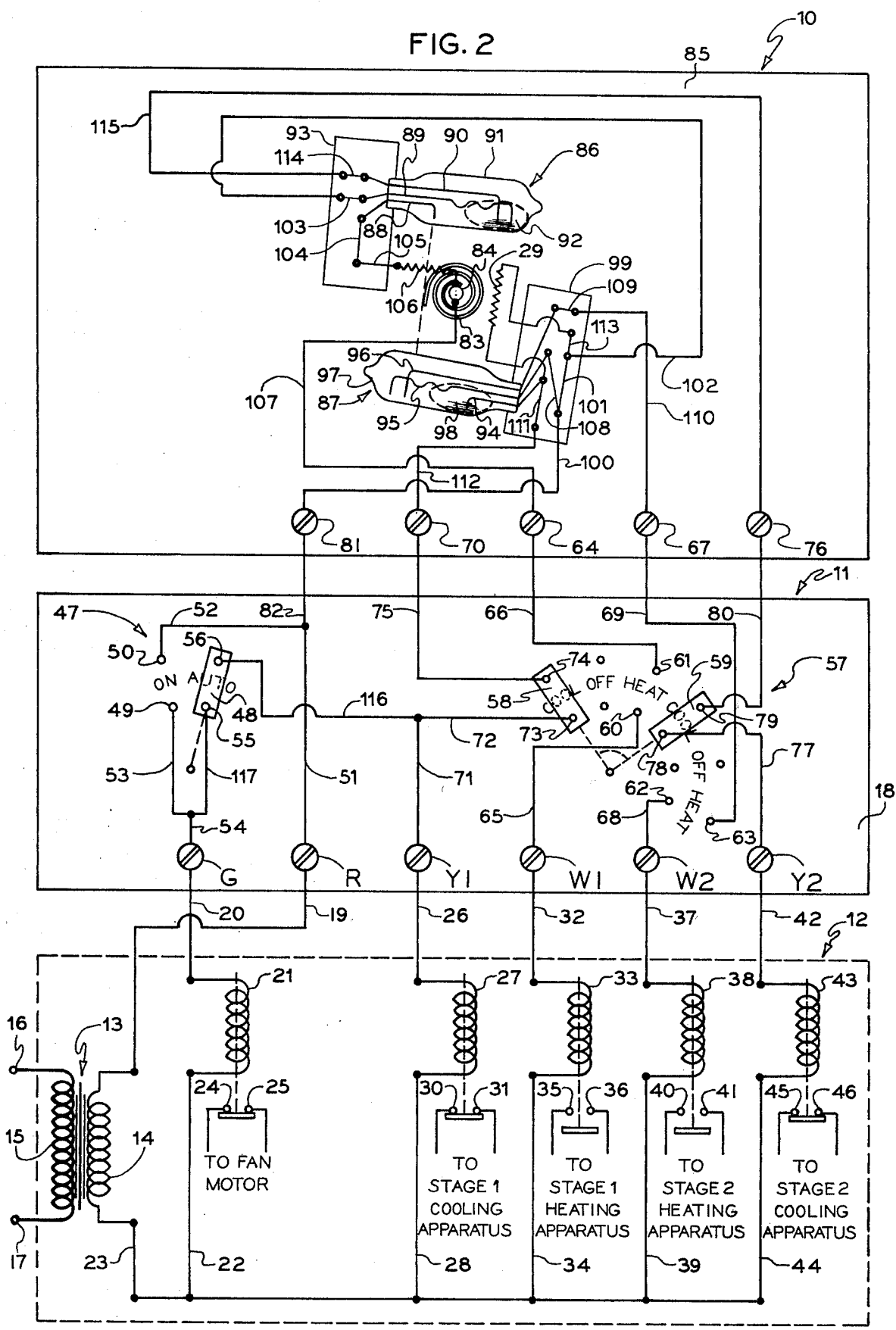
FIG. 2 is a diagrammatic illustration similar to FIG. 1, showing the system in the cooling mode with both stages of the cooling apparatus energized.
Figure 2A:
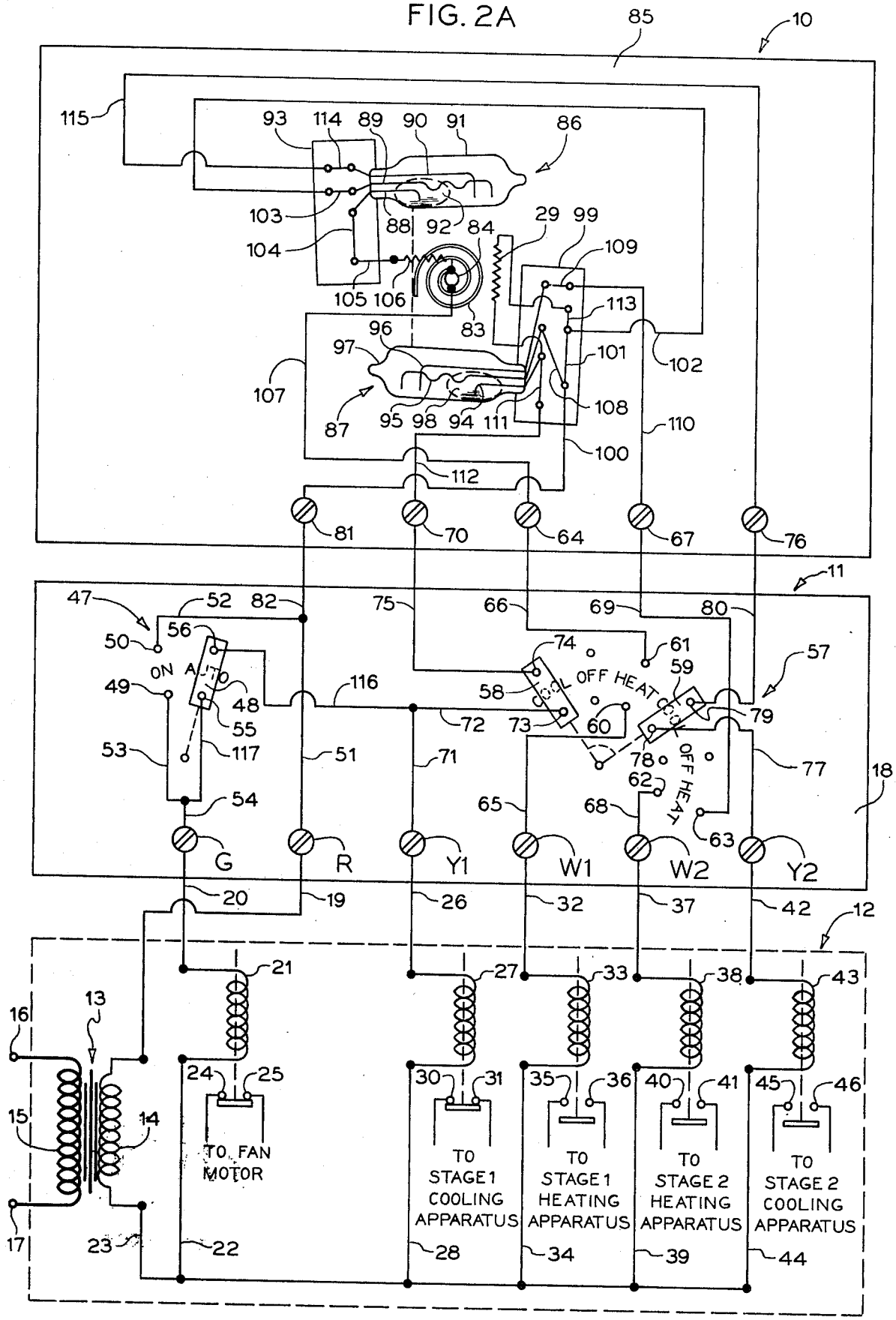
FIG. 2A is a diagrammatic illustration similar to FIG. 2, showing the system in the cooling mode with only stage one of the cooling apparatus energized.

When the shorting bar 58 is in the COOL position, as shown in FIGS. 2 and 2A, terminal Y1 is connected to a terminal 70 in the thermostat switch assembly 10 through a lead 71, a lead 72, a terminal 73, shorting bar 58, a terminal 74, and a lead 75, while terminal Y2 is connected to a terminal 76 in the thermostat switch assembly 10 through a lead 77, a terminal 78, shorting bar 59, a terminal 79, and a lead 80. In the OFF position, selector switch 57 provides no electrical connections between the thermostat switch assembly 10 and the su-base 11. Terminal R in the sub-base 11 is connected to a terminal 81 in the thermostat switch assembly 10 by lead 51 and a lead 82.

Referring to FIGS. 1, 1A, 2 and 2A, the thermostat switch assembly 10 includes a spirally wound bimetallic coil 83, the inner end of which is secured to a mounting shaft 84 which is mounted in an insulative mounting base 85. The outer end of the bimetallic coil 83 is operatively connected, by bracket means which will be hereinafter described, to a top switch 86 and a bottom switch 87, each of which is a single-pole, double-throw mercury type switch. The top switch 86 comprises electrodes 88, 89, and 90 which are sealed inside a glass bulb 91 along with a blob of mercury 92. Electrodes 88, 89, and 90 also extend outside the glass bulb 91 to an apertured printed circuit board 93 to which they are rigidly secured as by soldering. The mercury 92 is capable of connecting eletrodes 88 and 89 when the bulb is tilted in a counterclockwise direction and of connecting electrodes 89 and 90 when the bulb 91 is tilted in a clockwise direction. Similarly, the bottom switch 87 comprises electrodes 94, 95, and 96 sealed inside a glass bulb 97 along with its blob of mercury 98. Electrodes 94, 95, and 96 extend outside the glass bulb 97 to an apertured printed circuit board 99. The mercury 98 is capable of connecting electrodes 95 and 96 when the bulb is tilted in a counterclockwise direction and of connecting electrodes 95 and 94 when the bulb 97 is tilted in a clockwise direction.

The construction of the switches 86 and 87 and the bimetallic coil 83 is such that the differential of the switches 86 and 87 is approximately 2° F. That is, it requires approximately a 2° F temperature change, as sensed by the bimetallic coil 83, to cause the mercury 92 to move from one electrode connecting position to another and to cause the mercury 98 to move from one electrode connecting position to another.

The bimetallic coil 83 is constructed so that the outer end thereof and thus the top switch 86 and the bottom switch 87 operatively connected thereto move in a counterclockwise direction when the coil 83 responds to decreasing temperature, tilting the bulbs 91 and 97 downwardly in the direction of the electrodes 88 and 89 and electrodes 95 and 96. However, the top switch 86 and the bottom switch 87 are oriented with respect to each other so that after the coil 83 responds to a sufficient decrease in temperature to cause bulb 91 in the top switch 86 to tilt in a counterclockwise direction and cause its mercury 92 to connect the electrodes 88 and 89, an additional predetermined decrease in temperature is required before the bulb 97 in the bottom switch 87 will tilt suffciently to cause the electrodes 95 and 96 to be connected by its mercury 98. Similarly, after the bimetallic coil 83 responds to sufficient increase in temperature to cause the bulb 98 in the bottom switch 87 to tilt in a clockwise direction and cause its mercury 98 to connect the electrodes 95 and 94, an additional predetermined increase in temperature is required before the bulb 92 in the top switch 86 will tilt sufficiently to cause the electrodes 89 and 90 to be connected by its mercury 92. This predetermined increase and decrease in temperature is adjusted to be approximately 2° F, the same as the aforementioned diffferentials of the switches 86 and 87.

Referring to FIG. 1, with the system selector switch 57 in the HEAT position and the fan selector switch 47 in the AUTO position, the operation of the system will now be described. As coil 83 responds to a decreasing temperature, bulb 91 in the top switch 86 tilts in a counterclockwise direction, causing the mercury 92 to connect electrodes 88 and 89 as shown in FIG. 1A. This completes the circuit between sub-base terminals R and W1, the circuit being: from terminal R, lead 51, lead 82, terminal 81, a lead 100, a conductor 101, a lead 102, a conductor 103, electrode 89, mercury 92, electrode 88, a conductor 104, a lead 105, a resistor 106, which is thermally connected to coil 83 for heat anticipation purposes, mounting shaft 84, a conductor 107, terminal 64, lead 66, terminal 61, shorting bar 58, terminal 60, lead 65, to terminal W1. As heretofore described, this completion of the circuit between terminals R and W1 effects the energizing of the stage one heating apparatus.

Should bimetallic coil 83 sense approximately a 2° F increase in temperature, the bulb 91 will tilt in a clockwise direction causing mercury 92 to tilt and disconnect electrodes 88 and 89. However, should the temperature sensed by the coil 83 decrease an additional predetermined amount, approximately 2° F, the additional counterclockwise movement of the coil 83 will cause the bulb 97 in the bottom switch 87 to tilt sufficiently to cause its mercury 98 to connect electrodes 95 and 96 as shown in FIG. 1. This completes the circuit between sub-base terminals R and W2, the circuit being: from terminal R, lead 51, lead 82, terminal 81, lead 100, a conductor 108, electrode 95, mercury 98, electrode 96, a conductor 109, a lead 110, terminal 67, lead 69, terminal 63, shorting bar 59, terminal 62, lead 68, to terminal W2. As heretofore described, this completion of the circuit between terminals R and W2 effects the energizing of the stage two heating apparatus. The fan motor is controlled by a separate temperature responsive means (not shown).

FIGS. 2 and 2A shows the system selector switch 57 in the COOL position and the fan selector switch 47 in the AUTO position. In operation, as the bimetallic coil 83 responds to an increasing temperature, the bulb 97 in the bottom switch 87 tilts in a clockwise direction, causing the mercury 98 to connect electrodes 94 and 95 as shown in FIG. 2A. This completes the circuit between sub-base terminals R and Y1, the circuit being: from terminal R, lead 51, lead 82, terminal 81, lead 100, conductor 108, electrode 95, mercury 98, electrode 94, a conductor 111, a lead 112, terminal 70, lead 75, terminal 74, shorting bar 58, terminal 73, lead 72, lead 71, to terminal Y1. As heretofore described, this completion of the circuit between terminals R and Y1 effects the energizing of stage one cooling apparatus. It should be noted that the above connection of electrodes 94 and 95 shunts the resistor 29 which is connected in parallel with electrodes 94 and 95 by conductors 108, 101, and 113, and which is mounted on the printed circuit board 99 and located near coil 83. Resistor 29 provides anticipating heat to the coil 83 when the system selector switch 57 is in the COOL position and electrodes 94 and 95 are not connected by the mercury 98.

Should bimetallic coil 83 sense aproximately a 2° F decrease in temperature as a result of the energizing of the stage one cooling apparatus, the bulb 97 will tilt in a counterclockwise direction causing the mercury 98 to tilt and disconnect electrodes 94 and 95. However, should the temperatures sensed by the coil 83 increase an additional predetermined amount, approximately 2° F, the additional clockwise movement of the coil 83 will cause the bulb 91 in the top switch 86 to tilt suffficiently to cause its mercury 92 to connect electrodes 89 and 90 as shown in FIG. 2. This connection completes the circuit between sub-base terminals R and Y2, the circuit being: from terminal R, lead 51, lead 82, terminal 81, lead 100, conductor 101, lead 102, conductor 103, electrode 89, mercury 92, electrode 90, a conductor 114, a lead 115, terminal 76, lead 80, terminal 79, shorting bar 59, terminal 78, lead 77, to terminal Y2. As heretofore described, this completion of the circuit between terminals R and Y2 effects the energizing of the stage two cooling apparatus.

The fan motor is energized concurrently with the energizing of the stage one cooling apparatus, the circuit being: from terminal R, lead 51, lead 82, terminal 81, lead 100, conductor 108, electrode 95, mercury 98, electrode 94, conductor 111, lead 112, terminal 70, lead 75, terminal 74, shorting bar 58, terminal 73, lead 72, a lead 116, terminal 56, shorting bar 48, terminal 55, a lead 117, lead 54, to terminal G. As heretofore described, this completion of the circuit between terminals R and G effects the energizing of the fan motor.

Figure 3:
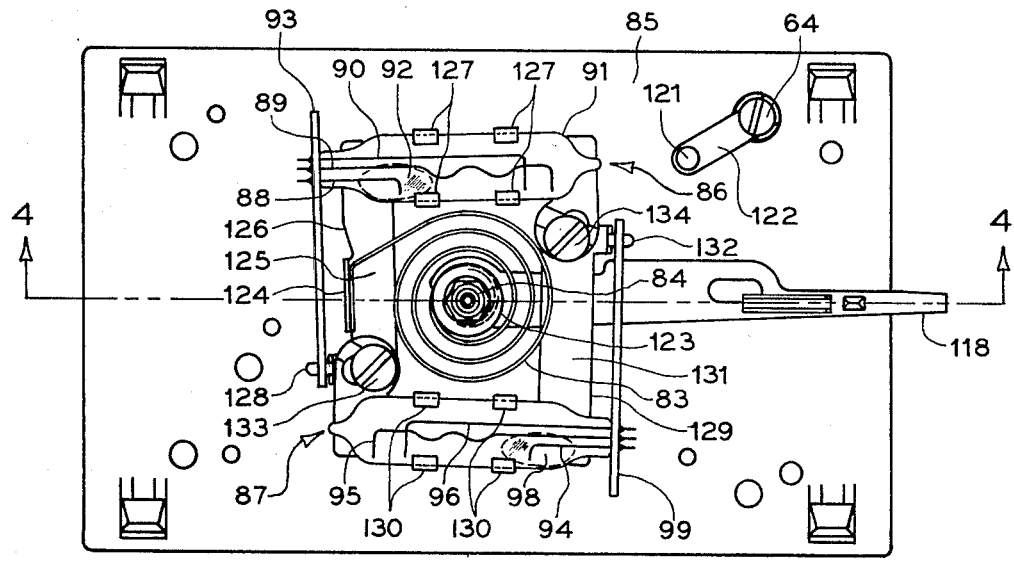
FIG. 3 is a front view of a space thermostat constructed in accordance with the present invention, with the sub-base, front cover, anticipator heaters, and electrical leads removed.
Figure 4:
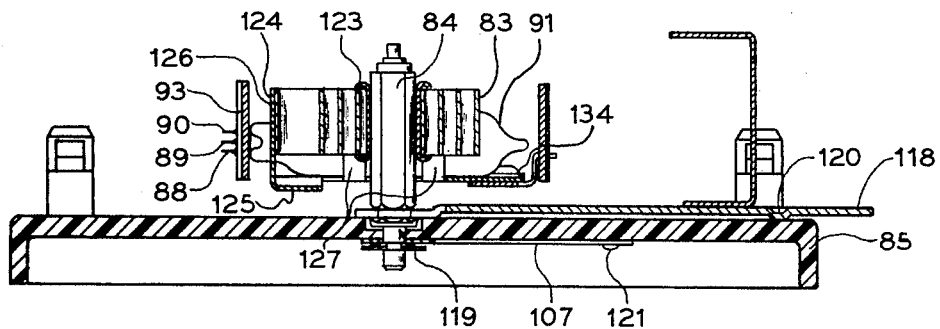
FIG. 4 is a longitudinal cross-sectional view taken along line 4—4 of FIG. 3.

A preferred construction of the thermostat switch assembly 10 is shown, in part, in FIGS. 3 and 4 wherein like numerals are used to designate like parts previously described in FIGS. 1, 1A, 2 and 2A. Referring to FIGS. 3 and 4, the mounting shaft 84 is mounted for rotation in base 85. An adjustment arm 118 for setting the desired space temperature to be maintained is press fitted on shaft 84 tightly enough so that the shaft 84 and the arm 118 normally rotate together. However, if the shaft 84 is held securely, the arm 118 may be rotated relative to the shaft 84. The shaft 84 is held in the base 85 by a spring clip 119 snapped into a groove formed in that portion of the shaft 84 extending through the base 85. The spring clip 119 biases an indented portion 120 of the adjustment arm 119 into slidable engagement with the top side of the base 85. Sandwiched between the spring clip 119 and the bottom side of base 85 is one end of a metal strip previously referred to as conductor 107 in FIGS. 1, 1A, 2 and 2A. The other end of the conductor 107 is secured by means of a rivet 121 to a terminal 122 into which the screw terminal 64 is threadedly engaged. For the sake of brevity, an adjustable heating anticipator, previously described in FIGS. 1, 1A, 2 and 2A as resistor 106 and normally mounted on the upper end of the mounting shaft 84, is not shown.

The inner end of the spirally wound bimetallic coil 83 is coined to a hollow rivet 123 which is secured to mounting shaft 84 in a force fit relationship so as to peclude relative movmement between the inner end of the coil 83 and the mounting shaft 84. The outer free end of the coil 83 is rigidly secured, as by spot welding, to a leg 124 which extends perpendicularly from a generally flat portion 125 of a switch mounting bracket 126.

Figure 5:
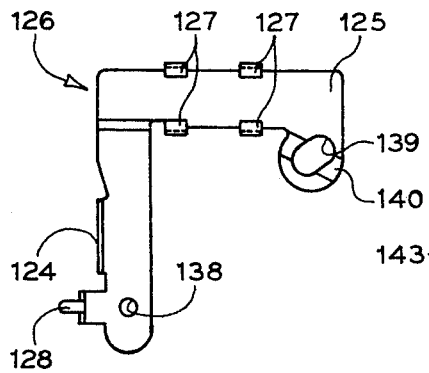
FIG. 5 is a front plan view of the mounting bracket to which the bimetallic coil and one of the mercury switches are attached.
Figure 7:
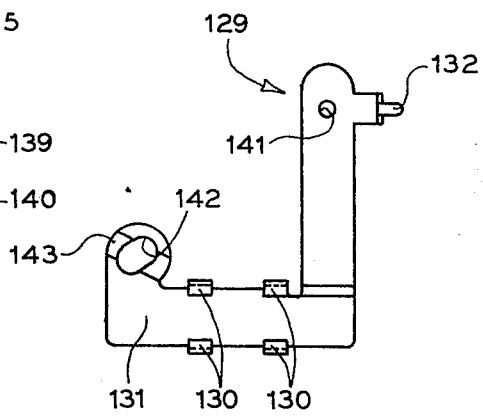
FIG. 7 is a front plan view of the mounting bracket to which the other mercury switch is attached.
Figure 6:
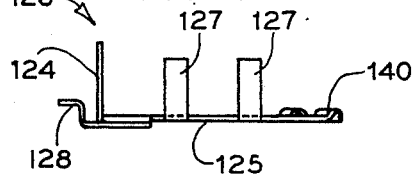
FIG. 6 is a bottom elevation view of the bracket of FIG. 5.

A single-pole, double-throw mercury switch, previously described as the top swtich 86 in FIGS. 1, 1A, 2 and 2A, is secured to the switch mounting bracket 126, shown in FIGS. 5 and 6 and hereinafter referred to as the top switch mounting bracket 126, by means of four resilient legs 127 which extend perpendiclarly from the flat portion 125 and are biased inwardly so as to rigidly clamp the bulb 91 in the top switch 86 between opposing legs 127. The portions of electrodes 88, 89, and 90 extending outwardly from the bulb 91 in top switch 86 are secured, as by soldering, to the apertured printed circuit board 93. To preclude strain on electrodes 88, 89, and 90, the printed circuit board 93 is also apertured to receive a tab 128 which extends outwardly from the flat portion 125 of top switch mounting bracket 126. Similarly, another single-pole, double-throw switch, previously described as the bottom switch 87 in FIGS. 1, 1A, 2 and 2A is secured to a bottom switch mounting bracket 129, shown in FIG. 7, by four resilient legs 130 extending perpendicularly from its flat portion 131. Electrodes 94, 95, and 96 are secured to the apertured printed circuit board 99 which is also apertured to receive a tab 132 extending outwardly from the flat portion 131 of the bottom switch mounting bracket 129. Printed circuit board 93, by providing mounting means for electrodes 88, 89, and 90 in addition to providing conductors 103, 104, and 114 as shown in FIGS. 1, 1A, 2 and 2A, and printed circuit board 99, by providing mounting means for electrodes 94, 95, and 96 in addition to providing conductors 101, 108, 109, 111, 113, and mounting means for resistor 29 as shown in FIGS. 1, 1A, 2 and 2A, reduce the amount of loose wiring thereby enabling a more compact and inexpensive construction.

Figure 8:
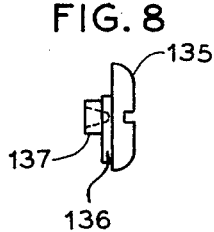
FIG. 8 is an enlarged side view of the cam-type slotted rivet utilized to adjustably connect the mercury switch mounting brackets.
Figure 9:
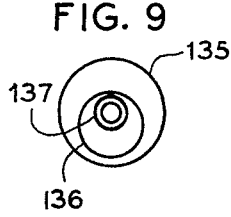
FIG. 9 is a rear view of the rivet of FIG. 8.

As previously described in FIGS. 1, 1A, 2 and 2A, the top switch 86 and the bottom switch 87 are oriented with respect to each other so as to require approximately a 2° F additional change in temperature beyond the temperature at which the stage one heating apparatus or the stage one cooling apparatus is energized before the stage two heating apparatus or the stage two cooling apparatus is energized. This orientation is accomplished by providing two identical cam-type slotted rivets 133 and 134 which adjustably connect the top switch mounting bracket 126 and the bottom switch mounting bracket 129. Referring to FIGS. 8 and 9, each of the rivets 133 and 134 include a slotted heat portion 135, a cam portion 136, and a tubular rivet portion 137. Referring to FIGS. 3, 5, 6, and 7, the flat portion 125 of the top switch mounting bracket 126 is provided with a small diameter hole 138 for receiving the tubular rivet portion 137 of rivet 133 and a generally oval-shaped hole 139 for receiving the cam portion 136 of rivet 134. There is a slightly raised surface 140 around a portion of the hole 139 to provide biasing on the underside of the slotted heat portion 135 of rivet 134. Similarly, the flat portion 131 of the bottom switch mounting bracket 129 is provided with a small diameter hole 141 for receiving the tubular rivet portion 137 of rivet 134, and with a generally oval shaped hole 142, around which there is a slightly raised surface 143, for receiving the cam portion 136 of rivet 133. To assemble, rivet 133 first passes through the oval-shaped hole 142 in the bottom switch mounting bracket 129 and then through the hole 138 in the top switch mounting bracket 126 for coining thereto. Similarly, rivet 134 first passes through the oval shaped hole 139 in the top switch mounting backet 126 and then through the hole 141 in the bottom switch mounting bracket 129 for coining thereto. Therefore, turning rivet 133 causes the bottom switch mounting bracket 129 to rotate about rivet 134, and turning rivet 134 causes the top switch mounting bracket 126 to rotate about rivet 133.

Referring to FIGS. 3 and 4, the space thermostat is calibrated by setting the adjustment arm 118 at the desired calibration temperature, holding the adjustment arm 118 rigid, and then turning the mounting shaft 84 until the mercury 92 in the top switch 86 tilts to the left and connects electrodes 88 and 89. This is the position the mercury 92 is in when the stage one heating apparatus is just energized. The adjustment arm 118 is then moved upward, rotating the mounting shaft 84 and the top switch 86 and bottom switch 87 in a counterclockwise direction an amount equal to the rotation of the switches 86 and 87 that would be caused by approximately a 2° F temperature decrease, as sensed by the bimetallic coil 83, beyond the temperature at which the stage one heating apparatus is just energized. In this position, it is required that the mercury 98 in the bottom switch 87 just tilt to the left to connect electrodes 95 and 96. If the mercury 98 did not just tilt, rivet 133 is turned, rotating the bottom switch mounting bracket 129 and thus the bottom switch 87 clockwise or counterclockwise, as needed, until the mercury 98 just tilts and connects electrodes 95 and 96. This is the position the mercury 98 is in when the stage two heating apparatus is just energized. It should be noted that normally only rivet 133 is adjusted. If additional adjustment is needed, rivet 134 is turned, moving the top switch mounting bracket 126 and thus the top switch 86 clockwise or counterclockwise, as needed, and then repeating the calibration procedure.

As heretofore described, it requires approximately a 2° F temperature change to cause mercury 92 and 98 to move from one electrode connecting position to another. This 2° F switch differential and the above-described callibration procedure, wherein the difference between the energizing temperature of the stage one heating apparatus and the stage two heating apparatus is adjusted to approximately 2° F, automatically extablishes the desired temperatures at which the stage one cooling apparatus and the stage two cooling apparatus are energized, thus negating any further calibration or adjustment. Specifically, since the switch differential of the bottom switch 87 is approximately 2° F, the stage one cooling apparatus is energized approximately 2° F above the temperature at which the stage two heating apparatus is energized. As a result of calibration, the temperature at which the stage two heating apparatus is energized is approximately 2° F below the temperature at which the stage one heating apparatus is energized. Therefore, the temperature at which the stage one cooling apparatus is energized is the same as the temperature at which the stage one heating apparatus is energized. Also, the 2° F temperature difference between the heating stages automatically establishes the energizing of the stage two cooling apparatus at approximately 2° F above the temperature at which the stage one cooling apparatus is energized.

Figure 10:
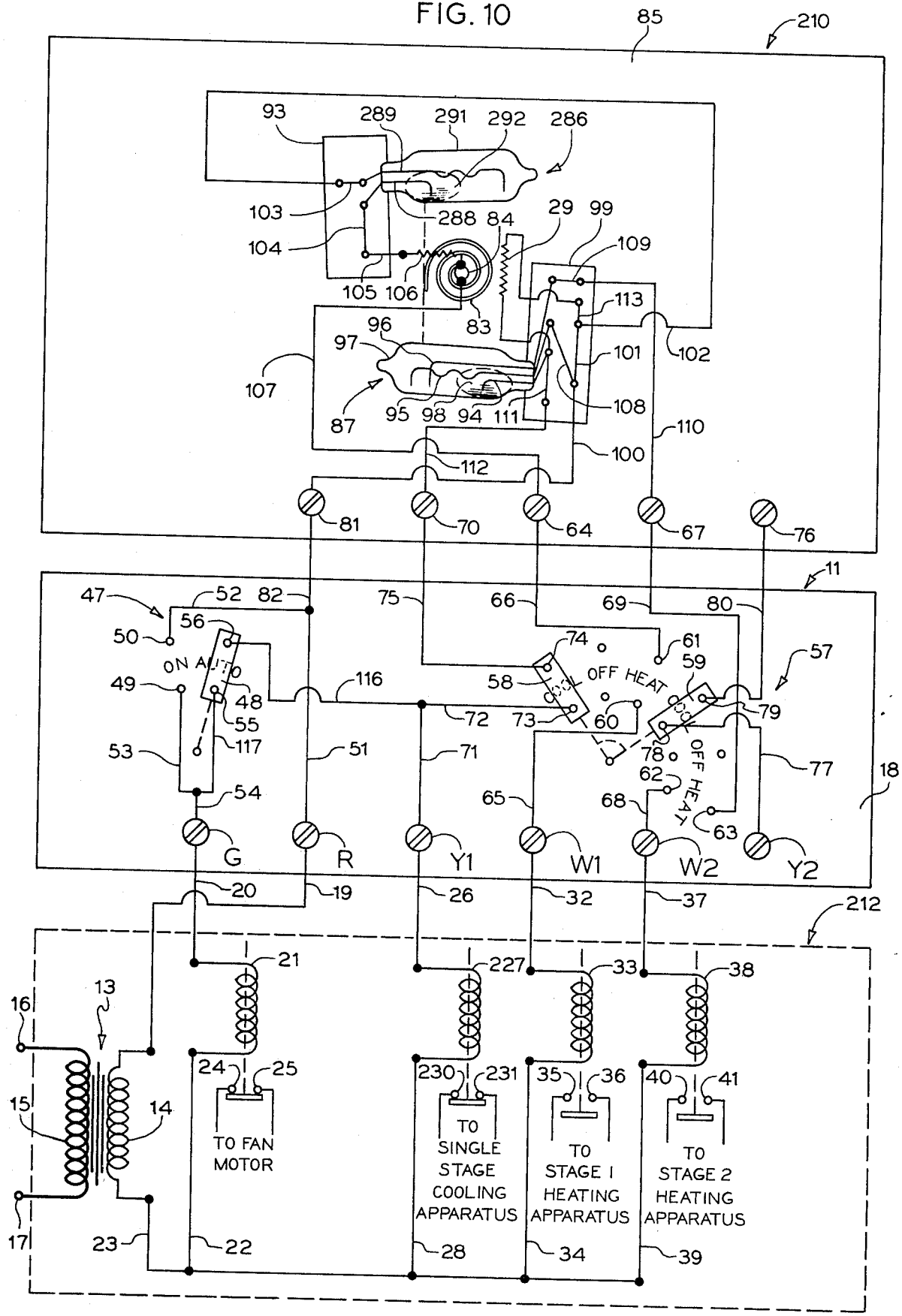
FIG. 10 is a diagrammatic illustration of a two-stage heating and single-stage cooling system including a space thermostat constructed in accordance with another form of the present invention and showing the system in the cooling mode with the single-stage cooling apparatus energized.
Figure 11:
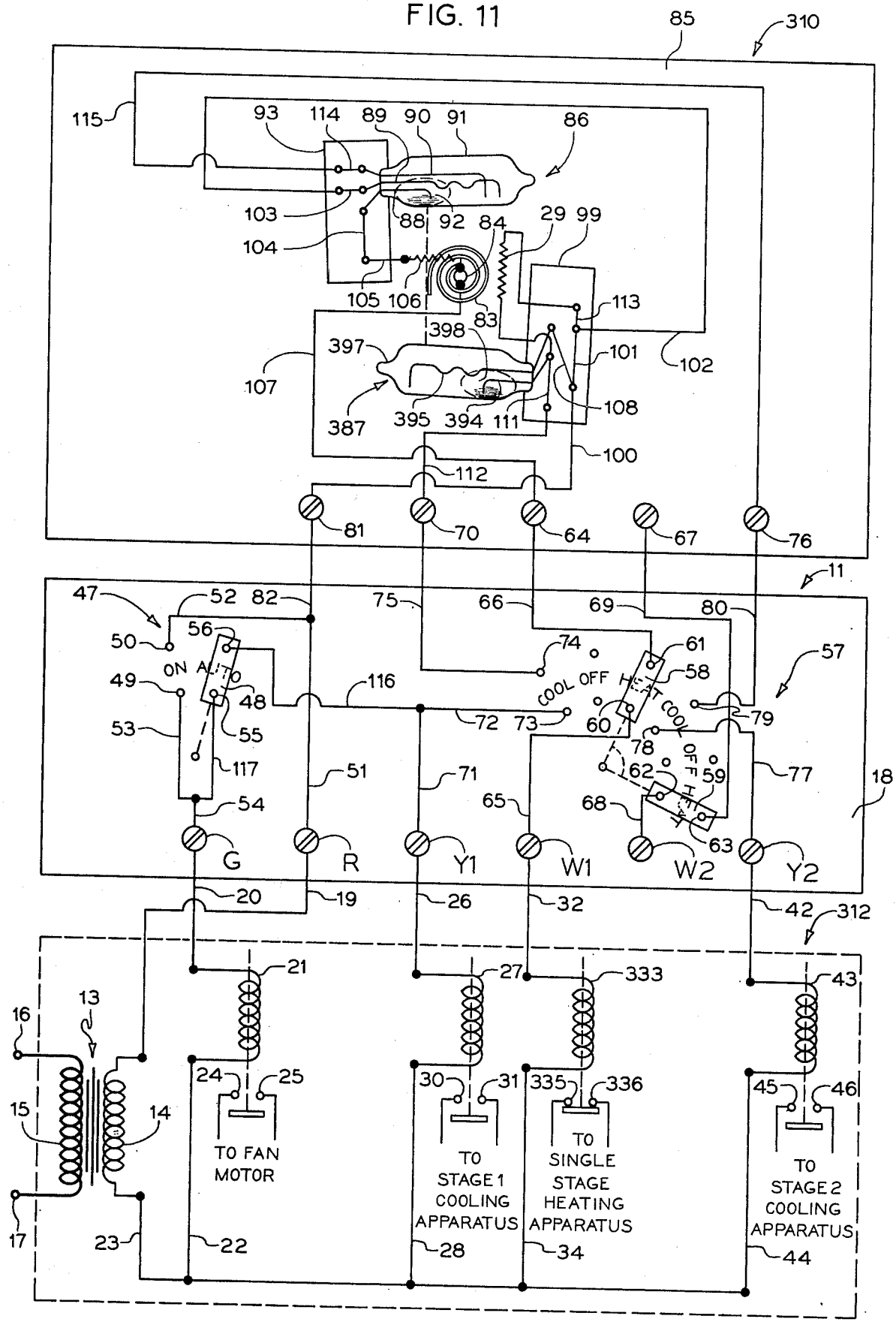
FIG. 11 is a diagrammatic illustration of a two-stage cooling and single-stage heating system including a space thermostat constructed with yet another form of the present invention and showing the system in the heating mode with the single-stage heating apparatus energized.

While the preferred embodiment of the present invention has been illustrated and described in detail in the drawings and foregoing description, it will be recognized that many changes and modifications will occur to those skilled in the art. For example, the basic concept of the present invention may also be utilized to control a heating and cooling apparatus wherein one of the apparatus is single-stage and the other is two-stage, by utilizing one single-pole, double-throw switch and one single-pole, single-throw switch in combination with a single bimetal coil. In such an arangement, the single-pole, single-throw switch energizes stage one of the two-stage apparatus when moved in one direction, and the single-pole, double-throw switch energizes stage two of the two-stage apparatus when moved more in the same direction and energizes the single-stage apparatus when moved in an opposite direction. An illustration of such an arrangement wherein the cooling apparatus is single-stage and the heating apparatus is two-stage is shown in FIG. 10, and an illustration of such an arrangement wherein the heating apparatus is single-stage and the cooling apparatus is two-stage is shown in FIG. 11. In the following description of the arrangements shown in FIGS. 10 and 11, these arrangements being modifications of those shown in FIGS. 1, 1A, 2, and 2A, only the structure associated with the modifications will be described. The same reference numerals are utilized for the same parts described above in connection with FIGS. 1, 1A, 2, and 2A. Reference numerals with 200 added are being utilized for similar parts in FIG. 10 and reference numerals with 300 added are being utilized for similar parts in FIG. 11.

Referring to FIG. 10, a space thermostat 210 is the same as the previously described thermostat 10 except that the top switch 286 is single-pole, single-throw. Switch 286 comprises electrodes 288 and 289 which are sealed inside a glass bulb 291 along with a blob of mercury 292. Mercury switches 286 and 87 are oriented with respect to each other in the same manner as previously described for switches 86 and 87. A heating and cooling apparatus 212 is the same as the previously described apparatus 12 except the cooling apparatus is single-stage and the energizing thereof is controlled by a power relay having a coil 227 and contacts 230 and 231.

FIG. 10 shows the system selector switch 57 in the COOL position. In operation, as the bimetallic coil 83 responds to an increasing temperature, the bulb 97 in the bottom switch 87 tilts in a clockwise direction causing its mercury 98 to connect electrodes 94 and 95 as shown in FIG. 10. This completes the circuit between sub-base terminals R and Y1 as previously described, so that the single-stage cooling apparatus is energized. Should bimetallic coil 83 subsequently sense approximately a 2° F decrease in temperature, the bulb 97 will tilt in a counterclockwise direction causing the mercury 98 to tilt and disconnect electrodes 94 and 95. Should the temperature sensed by the coil 83 increase approximately 2° F above the temperature at which electrodes 94 and 95 were connected as a result of the clockwise tilting of bulb 97, the additional clockwise movement of the bimetallic coil 83 will cause bulb 291 in the top switch 286 to tilt sufficiently to cause its mercury 292 to disconnect electrodes 288 and 289. Since electrodes 288 and 289 do not control the cooling apparatus and since there are no circuit connections completed by mercury 292 when it brakes connection between electrodes 288 and 289, this additonal clockwise movement of switch 286 has no effect on the operation of the single-stage cooling apparatus.

When the system selector switch 57 is in the HEAT positon, the operation of the system in FIG. 10 is identical to the operation of the system as described in conjunction with FIGS. 1 and 1A.

Referring to FIG. 11, a space thermostat 310 is the same as the previously described thermostat 10 except that the bottom switch 387 is single-pole, single-throw. Switch 387 comprises electrodes 394 and 395 which are sealed inside a glass bulb 397 along with its mercury blob 398. Mercury switches 86 and 387 are oriented with respect to each other in the same manner as previously described for switches 86 and 87. A heating and cooling apparatus 312 is the same as the previously described apparatus 12 except the heating apparatus is a single-stage apparatus controlled by a power relay having a coil 333 and contacts 336.

FIG. 11 shows the system selector switch 57 in the HEAT position. In operation, as the bimetallic coil 83 responds to a decreasing temperature, the bulb 91 in the top switch 86 tilts in a counterclockwise direction causing its mercury 92 to connect electrodes 88 and 89 as shown in FIG. 11. This completes the circuit between sub-base terminals R and W1 as previously described, so that the single-stage heating apparatus is energized. Should bimetallic coil 83 subsequently sense approximately a 2° F increase in temperature, the bulb 91 will tilt in a clockwise direction causing the mercury 92 to tilt and disconnect electrodes 88 and 89. Should the temperature sensed by the coil 83 decrease approximately 2° F below the temperature at which electrodes 88 and 89 were connected as a result of the counterclockwise tilting of bulb 91, the additional counterclockwise movement of the bimetallic coil 83 will cause bulb 397 in the bottom switch 387 to tilt sufficiently to cause its mercury 398 to disconnect electrodes 394 amnd 395. Since electrodes 394 and 395 do not control the heating apparatus and since there are no circuit connections completed by mercury 398 when it breaks connection between electrodes 394 and 395, this additional counterclockwise movement of switch 387 has no effect on the operation of the single-stage heating apparatus.

When the system selector switch 57 is in the COOL position, the operation of the system in FIG. 11 is identical to the operation of the system as described in conjunction with FIGS. 2 and 2A. It is therefore intended, by the appended claims, to cover any such changes and modifications as fall within the true spirit and scope of the invention.

We claim:

1. In a space thermostat for controlling a two-stage heating apparatus and a two-stage cooling apparatus, a single thermally responsive sensing element, electrical switch means comprising two double-throw switches operatively connected to said sensing element, electrical connection means for selectively connecting said switch means to said heating apparatus and to said cooling apparatus, one of said switches effecting the energizing of said one of said two-stage heating apparatus when moved in one direction in response to a decrease in temperature sensed by said sensing element and effecting the energizing of stage two of said two-stage cooling apparatus when moved in an opposite direction in response to an increase in temperature, and the other of said switches effecting the energizing of stage two of said two-stage heating apparatus when moved further in said one direction in response to an additional predetermined decrease in temperature to a temperature below the energizing temperature of said stage one of said two-stage heating apparatus and effecting the energizing of stage one of said two-stage cooling apparatus when moved a lesser amount in said opposite direction in response to a predetermined increase in temperature to a temperature below the energizing temperature of said stage two of said two-stage cooling apparatus.

2. In a space thermostat for controlling a two-stage heating apparatus and a two-stage cooling apparatus, a base, a mounting shaft rotatably secured to said base, a single spirally wound bimetallic coil having its inner end secured to said shaft, a pair of switch mounting means secured in spaced relationship to the outer free end portion of said coil for movement therewith, a pair of single-pole, double-throw mercury switches attached to said switch mounting means, heating circuit connections including a system selector switch means in one position connecting said mercury switches to said heating apparatus, cooling circuit connections including said system selector switch means in another position connecting said mercury switches to said cooling apparatus, one of said mercury switches effecting the energizing of stage one of said two-stage heating apparatus when tilted in one direction to a first conductive position in response to a decrease in temperature sensed by said coil and effecting the energizing of stage two of said two-stage cooling apparatus when tilted in an opposite direction to a second conductive position in response to an increase in temperature, the other of said mercury switches effecting the energizing of stage two of said two-stage heating apparatus when tilted further in said one direction to a first conductive position in reponse to an additional predetermined decrease in temperature to a temperature below the energizing temperature of said stage one of said two-stage heating apparatus and effecting the energizing of stage one of said two-stage cooling apparatus when tilted a lesser amount in said opposite direction to a second conductive position in response to a predetermined increase in temperature to a temperature below the energizing temperature of said stage two of said two-stage cooling apparatus, and said switch mounting means including means for independently adjusting said mercury switches.

3. The space thermostat claimed in claim 2 in which said mercury switches are adjusted with respect to each other so that the temperature differentials between said heating stages and between said cooling stages are the same as the temperature differential required to cause said mercury switches to be tilted from their said first to second conductive positions and so that the said one mercury switch is in its said first conductive position and the said other mercury switch is in its second conductive position at a pedetermined temperature, whereby energization of stage one of said heating apparatus or stage one of the said cooling apparatus will occur at said predetermined temperature depending upon the position of said selector switch.

4. In a space thermostat for controlling a two-stage heating apparatus and a two-stage cooling apparatus, a single spirally wound bimetallic coil, switch mounting means secured to said coil for movement therewith, a pair of single-pole, double-throw mercury switches attached to said switch mounting means, said mercury switches each having a first conductive position to which they are successively tilted by said coil as it responds to decreasing temperatures and each having a second conductive position to which they are successively tilted as said coil responds oppositely to increasing temperatures, heating circuit connections including a selector switch means in one position connecting said mercury switches to said heating apparatus, cooling circuit connections including said selector switch means in another position connecting said mercury switches to said cooling apparatus, said switch mounting means including adjusting means for orienting said mercury switches with respect to each other so that a predetermined temperature differential is required to effect the successive tilting thereof to their said first conductive positions, and said predetermined temperature differential being the same as that required to effect the tiling of said mercury switches from their said first conductive positions and their said second conductive positions.

5. The space thermostat claimed in claim 4 wherein said heating circuit connections include an anticipation heating means disposed in heating proximity to said coil and being energized to heat said coil to cause said mercury switches to tilt toward said second conductive positions.

6. The space thermostat claimed in claim 4 wherein said cooling circuit connections include an anticipation heating means disposed in heating proximity to said coil and being energized when said mercury switches are not in their said second conductive positions to heat said coil to cause said mercury switches to tilt toward said second conductive positions.

7. The space thermostat claimed in claim 4 wherein a printed circuit board is attached to each of said mercury switches and movable therewith, and said printed circuit boards containing portions of said heating circuit connections and said cooling circuit connections.

8. The space thermostat claimed in claim 7 wherein said circuit connections include an anticipation resistor mounted on one of said printed circuit boards.

9. In a space thermostat for controlling heating and cooling apparatus wherein one apparatus is a single-stage apparatus and the other is a two-stage apparatus, a single thermally responsive sensing element, electrical switch means comprising a single-throw switch and a double-throw switch operatively connected to said sensing element, electrical connection means for selectively connecting said switches to said heating apparatus and to said cooling apparatus, said single-throw switch effecting the energizing of stage one of said two-stage apparatus when moved in one direction in response to a change in temperature sensed by said sensing element, and said double-throw switch effecting the energizing of stage two of said two-stage apparatus when moved further in said one direction in response to a further predetermined change in temperature in the same direction and effecting the energizing of said single-stage apparatus when moved in an opposite direction in response to an opposite change in temperature.

10. In a space thermostat for controlling heating and cooling apparatus wherein one apparatus is a single-stage apparatus and the other is a two-stage apparatus, a base, a mounting shaft rotatably secured to said base, a single spirally wound bimetallic coil having its inner end secured to said shaft, switch mounting means secured to the outer free end of said coil for movement therewith, a pair of mercury switches attached to said switch mounting means, one of said switches being single-throw and the other end of said switches being double-throw, electrical connection means for selectively connecting said switches to said heating apparatus and to said cooling apparatus, said single-throw switch effecting the energizing of stage one of said two-stage apparatus when tilted in one direction to a conductive position in response to a change in temperature sensed by said coil, said double-throw switch effecting the energizing of stage two of said two-stage apparatus when tilted further in said one direction to a first conductive position in response to an additional predetermined change in temperature in the same direction and effecting the energizing of said single-stage apparatus when tilted in an opposite direction to a second conductive position in response to an opposite change in temperature, and said switch mounting means including adjusting means for orientating said switches with respect to each other so that the temperature at which said single-throw switch is tilted to said conductive positions the same as the temperature at which said double-throw switch is tilted to said second conductive position.

11. In a space thermostat for controllng heating and cooling apparatus wherein at least one of the apparatus is a two-stage apparatus, a single thermally responsive sensing element, two electrical switches operatively connected to said sensing element, at least one of which is a double-throw switch, electrical connection means for selectively connecting said switches to said heating apparatus and to said cooling apparatus, one of said switches effecting the energizing of stage one of one of said apparatus when moved in one direction in response to a change in temperature sensed by said sensing element, and the other of said switches effecting the energizing of stage two of said one of said apparatus when moved further in said one direction in response to a further predetermined change in temperature in the same direction and effecting the energizing of at least one stage of the other of said apparatus when moved in an opposite direction in response to an opposite change in temperature.

* * * * *